United States Patent
Johnstone, III et al.

(10) Patent No.: US 6,742,308 B1
(45) Date of Patent: Jun. 1, 2004

(54) SWIVEL JOINT APPARATUS AND METHOD FOR UTILITY SUPPLY TO A ROTATABLE BUILDING

(75) Inventors: Albert E. Johnstone, III, 4903 Mt. Helix Dr., La Mesa, CA (US) 91941; Frank W. Radlitt, Alpine, CA (US)

(73) Assignees: Albert E. Johnstone, III, La Mesa, CA (US); Janet L. Johnson, La Mesa, CA (US)

(*) Notice: Subject to any disclaimer, the term of this patent is extended or adjusted under 35 U.S.C. 154(b) by 473 days.

(21) Appl. No.: 09/687,687

(22) Filed: Oct. 13, 2000

(51) Int. Cl.$^7$ ................................................. E04B 1/346
(52) U.S. Cl. ..................... 52/65; 52/30; 52/31; 52/32; 52/29; 52/73; 52/220.1; 52/220.8; 472/1
(58) Field of Search .................. 52/65, 220.1, 220.8, 52/29, 73, 31, 32, 30; 472/1

(56) References Cited

U.S. PATENT DOCUMENTS

| | | | | |
|---|---|---|---|---|
| 360,508 A | * | 4/1887 | Brown ........................ 52/65 |
| 390,093 A | * | 9/1888 | Pauly et al. .................. 52/65 |
| 407,877 A | * | 7/1889 | Rowe .......................... 52/29 |
| 2,563,531 A | * | 8/1951 | Kirkman et al. ............. 52/65 |
| 2,701,146 A | | 2/1955 | Warren |
| 3,513,871 A | | 5/1970 | Johnston |
| 3,599,378 A | * | 8/1971 | Kachnic ...................... 52/29 |
| 3,636,975 A | * | 1/1972 | Kirkman et al. ........... 137/580 |
| 3,664,523 A | * | 5/1972 | Hagel ....................... 414/255 |
| 3,851,663 A | * | 12/1974 | Neuko ...................... 137/580 |
| 3,905,166 A | | 9/1975 | Kaiser |
| 3,910,309 A | * | 10/1975 | Kaiser et al. .............. 137/580 |
| 3,933,400 A | | 1/1976 | Helgeson |
| 4,016,990 A | * | 4/1977 | Hodkin et al. ............. 414/398 |
| 4,234,215 A | * | 11/1980 | Wilson ....................... 285/41 |
| 4,250,918 A | * | 2/1981 | Tuson et al. .............. 137/580 |
| 4,262,694 A | * | 4/1981 | McConnell ................ 239/728 |
| 4,323,268 A | * | 4/1982 | Wilson ....................... 285/41 |
| 4,353,608 A | * | 10/1982 | Massau ....................... 439/3 |
| 4,498,398 A | * | 2/1985 | Vallee ....................... 104/44 |
| 4,602,806 A | * | 7/1986 | Saliger ....................... 285/41 |
| 4,644,707 A | * | 2/1987 | Aubourg et al. ............. 52/65 |
| 4,726,316 A | * | 2/1988 | Bruns ....................... 114/263 |
| 4,759,573 A | * | 7/1988 | Delamare ................. 285/124.4 |
| 4,877,054 A | * | 10/1989 | Walter ...................... 137/560 |
| 4,953,488 A | * | 9/1990 | Heidtmann ................. 114/44 |
| 5,113,974 A | * | 5/1992 | Vayda ........................ 186/36 |
| 5,205,768 A | * | 4/1993 | Pollack ....................... 441/5 |

(List continued on next page.)

FOREIGN PATENT DOCUMENTS

| | | |
|---|---|---|
| DE | 3426708 A1 | 1/1986 |
| DE | 90 16 212.9 | 3/1991 |
| FR | 1420219 | 12/1965 |
| FR | 3429956 | 1/1980 |

*Primary Examiner*—Carl D. Friedman
*Assistant Examiner*—Christy M. Green
(74) *Attorney, Agent, or Firm*—Gordon & Rees LLP

(57) ABSTRACT

A swivel joint apparatus for supplying utilities to a rotating building rotatable about a central axis has an inner, fixed spindle for securing to a fixed base of the building to extend co-axially with a central axis of rotation of the building, and an outer casing rotatably mounted on the spindle for securing to the rotatable part of the building. The spindle has a series of spaced annular flanges defining a series of annular chambers and at least one ring seal mounted on the peripheral edge of each flange for rotatable sealing engagement with the outer casing so that the casing forms an outer wall of each of the annular chambers. A lower end wall of the spindle has a plurality of ports for connection to fixed utility lines in the base for fluid supply to and from the building, each port connected through the spindle to a respective annular chamber. The outer casing has a series of axially spaced ports for connection to respective utility lines in the rotatable part of the building, the ports including at least one port communicating with each of the annular chambers.

15 Claims, 5 Drawing Sheets

U.S. PATENT DOCUMENTS 5,755,160 A * 5/1998 Blufordcraving ............ 104/36
5,829,941 A * 11/1998 Zamorano Morfin ....... 414/261
5,918,424 A * 7/1999 Rice .............................. 52/65
5,922,941 A * 7/1999 Winkler et al. ................ 73/40
6,401,746 B1 * 6/2002 Scott, Jr. .................... 137/312
6,402,202 B1 * 6/2002 Colombo ................. 285/121.1
6,457,280 B1 * 10/2002 Park .............................. 52/65

* cited by examiner

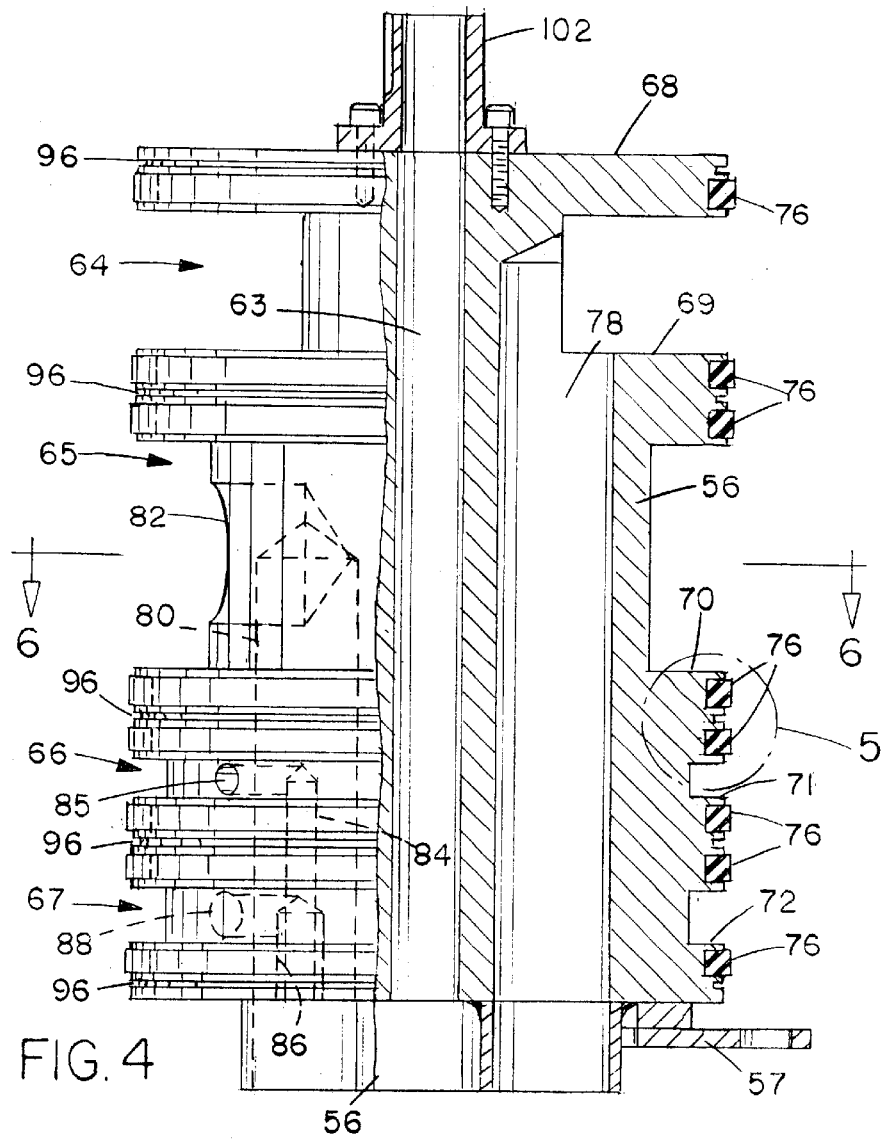
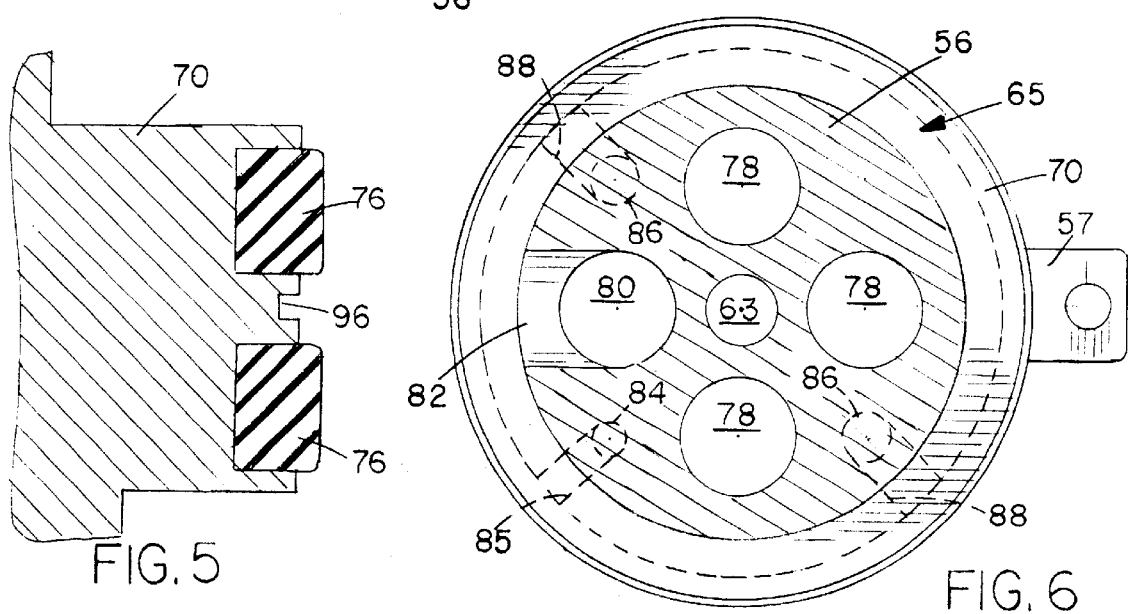

SWIVEL JOINT APPARATUS AND METHOD FOR UTILITY SUPPLY TO A ROTATABLE BUILDING

BACKGROUND OF THE INVENTION

The present invention relates generally to rotatable buildings, and is particularly concerned with a service or utilities supply swivel joint apparatus and method for such a building.

Although rotating buildings such as restaurants have been constructed in the past, up to now there has been no effective and safe way to provide services utilities or services such as water, gas or electrical power from stationary lines into the rotating part of the structure. Typically, such services are provided in a fixed central portion of the building about which an outer portion rotates.

Some prior art references have proposed swivel structures for providing services within the rotating part of a building, but these are relatively complex and cumbersome, and would have problems in passing building safety codes. For example, U.S. Pat. No. 3,599,378 of Kachnic and U.S. Pat. No. 3,636,975 of Kirkman both describe utility arrangements for rotating buildings. In Kachnic, a rotatable hollow support column is rotatably mounted on a fixed pedestal and extends upwardly through the building so as to rotate with the building. Various rotary T and L joints are provided for connecting fixed portions of the gas and water pipes with portions which rotate with the building. This produces a relatively complex structure. In Kirkman, a chamber member is fixed to a stationary base, and a cover member for the chamber member rotates with the building. The chamber and cover are provided with various opposing annular formations of generally U-shaped form or opposing partial chambers to which the fixed conduits and rotating conduits, respectively, are connected. This provides for waste material discharge, gas supply, and water supply. Again, this is relatively complex and would probably not pass building codes. It also does not provide for electrical connections into the building.

U.S. Pat. No. 4,353,608 of Massau describes a system of collectors for passage of fluids and electrical cables into and out of a rotatable dwelling. Each collector is generally annular in shape, comprising an inner fixed ring and an outer rotating ring rotatably connected together to define an annular chamber between them.

Another problem with existing swivel structures for rotatable buildings is hat the seals between rotating portions of the swivel are subject to potential failure. There is no means of effectively detecting such failure other than by taste or appearance of the water supply, for example.

SUMMARY OF THE INVENTION

It is an object of the present invention to provide a new and improved swivel joint apparatus and method for supplying utilities to a rotatable building.

According to one aspect of the present invention, a swivel joint apparatus is provided for supplying utilities to a rotating building rotatable about a central axis, which comprises an inner, fixed spindle for securing to a fixed base of the rotatable building to extend co-axially with a central axis of rotation of the building, the spindle having a series of spaced, outwardly projecting annular flanges defining a series of annular chambers between each adjacent pair of flanges, each flange having an outer peripheral edge and at least one ring seal mounted on the peripheral edge of each flange, the flanges having a predetermined outer diameter, and an outer casing rotatably mounted on the spindle for securing to part of the rotating building, the casing having an inner diameter substantially equal to the outer diameter of the flanges, the casing forming an outer wall of each of the annular chambers and being in rotatable sealing engagement with each of the ring seals to seal the chambers. The spindle has a lower end wall with a plurality of ports for connection to fixed utility lines in the fixed base of the building for fluid supply to and from the building, and a bore extending from each port through the spindle to a respective annular chamber, with each chamber being connected to at least one port in the lower end wall. The outer casing has a series of axially spaced ports including at least one port communicating with each of the annular chambers.

In an exemplary embodiment of the invention, each flange has an outwardly directed, annular sensor chamber spaced outwardly from the ring seal, the outer casing has a plurality of holes including at least one hole aligned with each of the sensor chambers, and a plurality of fluid sensors are mounted in the outer casing to project through the respective holes to sense any leakage of fluid past any of the seals. The sensor outputs are connected to a control unit which indicates failure of any of the seals. The simple construction of the rotary utilities swivel assembly is such that it can be easily accessed for repair, simply by disconnecting the attached utility lines via suitable quick disconnect fixtures, and removing and replacing any malfunctioning seal. At least two sensors may be provided in each of the sensor chambers, so that seal failure will still be detected even if one of the sensors should fail.

At least four annular chambers may be provided on the spindle, and the chambers are of different sizes depending on the fluid to be passed through the chamber. The chambers may include a sewer chamber for transmitting waste from fixtures in the building to fixed sewer lines in the base, a gray water chamber for transmitting waste water from sinks, baths, showers and the like to gray water disposal lines in the base, a water chamber for supplying mains water to taps in various fixtures within the rotatable building, and a gas supply chamber for supply of gas to any gas fixtures in the building. Two ring seals may be provided on each annular flange which separates two adjacent chambers, with a sensor chamber between each pair of ring seals to detect leakage of fluid past any of the ring seals, the sensors in each sensor chamber between the gas supply chamber and adjacent chambers including both water sensors and gas sensors.

In an exemplary embodiment, an electrical swivel assembly is mounted on the upper walls of the spindle and outer casing, the electrical swivel assembly comprising a fixed contact core mounted on the upper wall of the fixed spindle and an outer rotating contact portion mounted on the upper wall of the outer casing, the spindle and contact core having aligned central through bores for passageway of fixed electrical power supply lines from the base of the building to the contact core, and the outer contact portion having contacts for connection to power supply lines supplying power to fixtures within the rotating building. A separate rotary electrical connector may be mounted on the electrical swivel for supply of electrical signals such as telephone, television, cable, computer, e-mail and Internet to and from the rotating building, the rotary connector having a fixed part for connection to fixed electrical service lines extending through the aligned central through bores of the spindle and electrical contact core, and a rotary part rotatably mounted on the fixed part and having conductors for connection to electrical service lines within the rotating building, the fixed part being coupled to the inner contact core of the electrical swivel.

According to another aspect of the present invention, a method of rotatably connecting fixed utility lines beneath a rotatable building to corresponding utility lines secured within the building and rotatable with the building is provided, which comprises the steps of:

connecting a plurality of fixed utility lines in a fixed base of a rotatable building to inlet ports at the lower end of a fixed spindle secured to the fixed base and extending co-axially with the axis of rotation of the building, the spindle having a plurality of axially spaced annular chambers defined between annular flanges projecting outwardly from the spindle, each port being connected to a respective chamber;

connecting an outer casing rotatably mounted on the spindle to part of the rotating building so that the casing rotates with the building, the casing forming an outer wall of each of the annular chambers; and connecting a plurality of utility lines secured within the rotatable building to respective ports in the outer casing, at least one port in the outer casing communicating with each of the annular chambers.

The swivel joint apparatus of this invention is very simple and compact in construction, yet allows for reliable connection of fixed utility lines in a fixed base of a rotatable building to corresponding utility lines mounted within the rotating part of the building. The seal and sensor arrangement allows any leakage of fluids past a seal to be detected, avoiding or reducing the risk of different fluids mixing together without knowledge of the occupants of the rotatable building. This swivel joint apparatus therefore enables a rotatable building to meet stringent building codes more readily.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 4 is a front elevational view, partially in section, of the inner fixed core of the swivel assembly;

FIG. 5 is an enlarged section of the circled portion of FIG. 4 labeled 5;

FIG. 6 is a section on the lines 6—6 of FIG. 4;

DETAILED DESCRIPTION OF THE DRAWINGS

Figure 1:
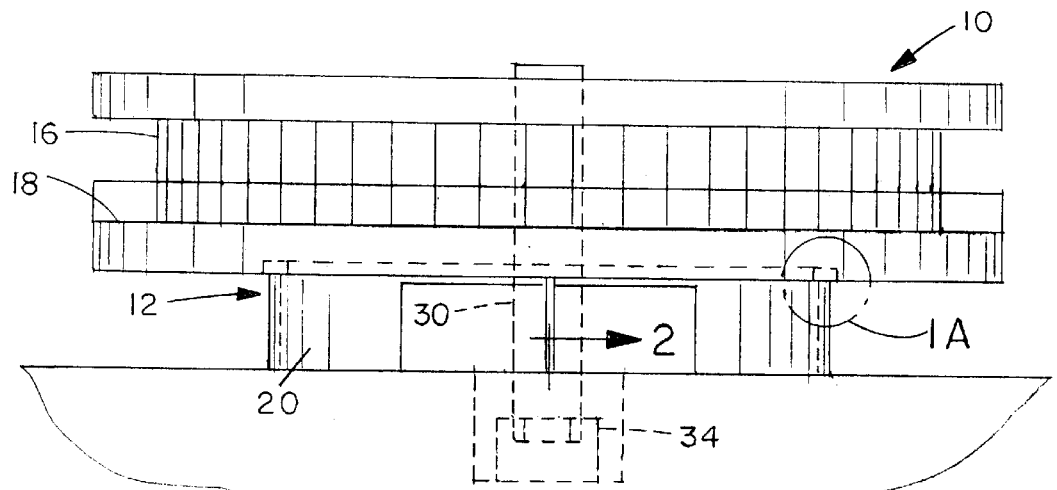
FIG. 1 is a front elevational view of a rotatable building having a service supply swivel support apparatus according to a preferred embodiment of the present invention.
Figure 2:
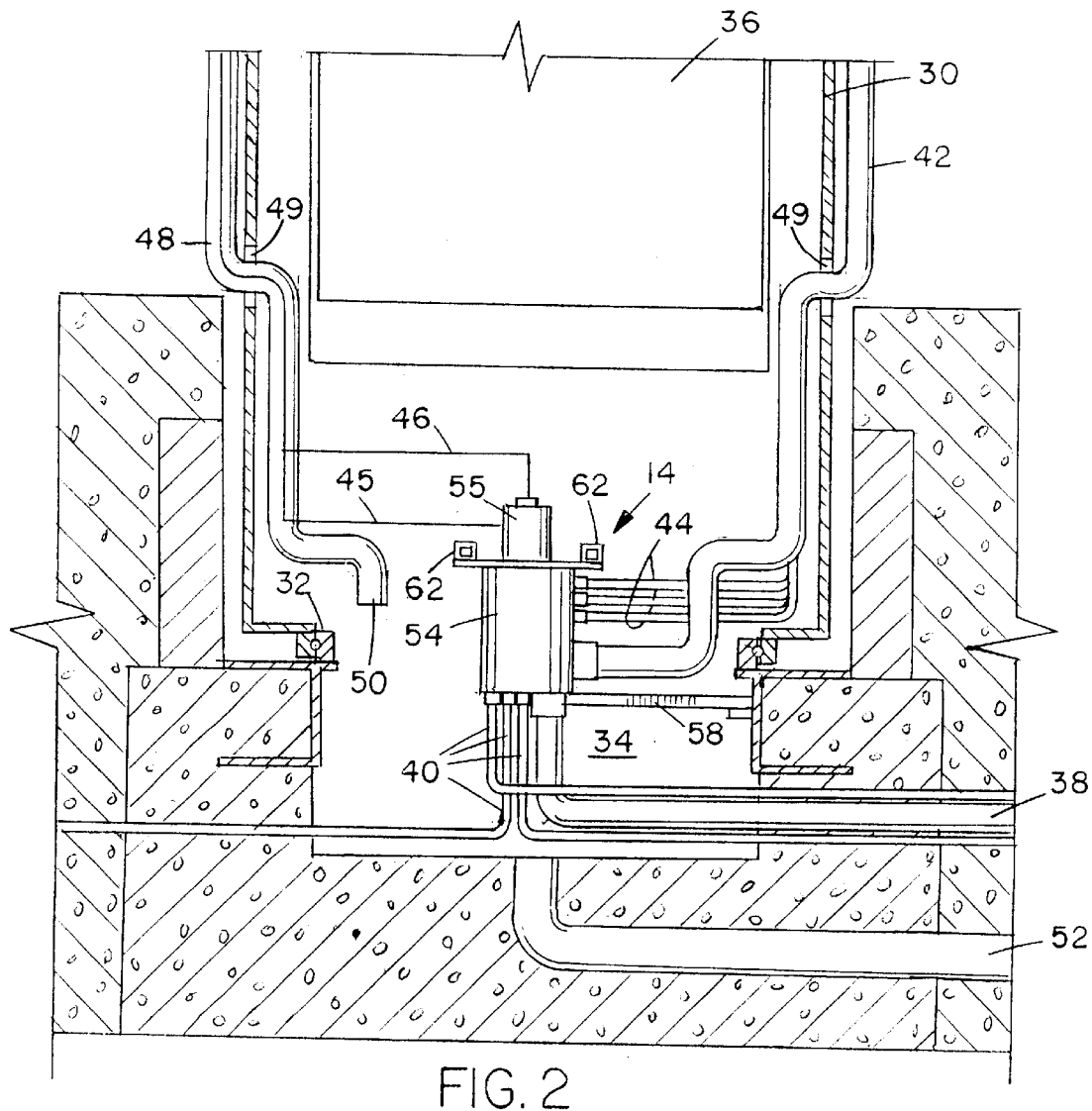
FIG. 2 is a cross-section through a portion of the support base of the building on lines 2—2 of FIG. 1, with some of the utility lines into and out of the building omitted for clarity.
Figure 1A:
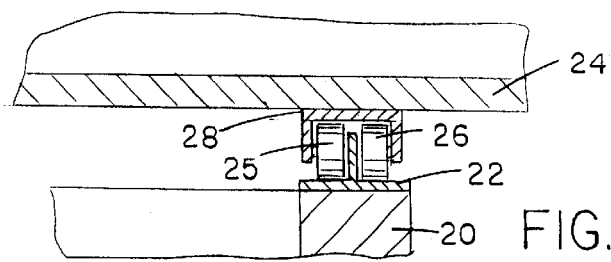
FIG. 1A is a sectional view of the circled area labeled 1A in FIG. 1, illustrating the outer rail support of the rotating part of the structure on the lower fixed base.

FIG. 1 of the drawings illustrates a rotatable building such as a house or the like which has a rotatable portion or living area 10 rotatably supported on a fixed base 12 as illustrated in FIGS. 1A and 2. A service swivel joint assembly 14 according to a preferred embodiment of the present invention is provided in the fixed base for supplying electrical power and services, water, gas, and other utilities to the rotating structure.

The rotatable building 10 in the illustrated embodiment is circular in shape, although other shapes may be utilized, and has an enclosed central living area 16, which preferably has windows around the entire circumference, surrounded by an annular deck or balcony 18 extending around the entire outer periphery of the building. The fixed base 12 has a cylindrical outer wall 20 with an inverted T rail 22 of steel running around its upper rim, as illustrated in FIG. 1A. The floor 24 of the rotating structure has a series of spaced inner and outer bearings 25,26 which run around the rail and which are mounted in wobble boxes 28 in groups of four. The base 12 provides a garage space for storage of vehicles and the like.

The rotating portion 10 of the building is also rotatably supported at its center via a central elevator shaft 30 which is rotatably supported at its lower end on a bearing assembly 32 in a central swivel chamber or pit 34 which is located below the ground level and centered on the central axis of the building, as indicated in FIGS. 1 and 2. Elevator shaft 30 extends upwardly from the submerged chamber 34 to the top of the building, and an elevator car 36 within the shaft is suitably driven to transport the inhabitants from the garage level to and from the upper stories of the building. The central bearing assembly 32 is of sufficient strength to support the rotating elevator shaft 30. In one example, the shaft 30 had an outer diameter of six feet and a height of 28 feet, and the bearing was a six feet diameter, 1,364,000 lb bearing model A18-60P1B manufactured by Rotek, Inc. of Aurora, Ohio.

Various fixed utility lines such as sewer line 38, and other utility lines 40 such as water, waste water or gray water, gas, electrical power, and electrical services such as telephone, cable, television, computer, and the like, are directed into the chamber 34 for connection to a fixed part of the swivel joint assembly 14. Corresponding sewer 42, other utilities 44, electrical power lines 45, and electrical service lines 46 are connected to rotating parts of the swivel joint assembly at their lower ends, and extend upwardly alongside the elevator shaft 30 for connection to plumbing, gas and electrical fixtures throughout the rotating portion of the building. A drain line 48 extends downwardly from the roof of the building alongside the elevator shaft and back through a window 49 in the shaft within the chamber 34. Line 48 has an outlet end 50 directed downwardly in the pit or chamber 34. A drain outlet 52 is provided in the lower end of the chamber 34 for drainage of water from the roof. It will be understood that the various incoming and outgoing service lines are shown schematically and not in any particular order. Also, in practice, all of the lines can be directed outwardly through a single rectangular opening in the elevator shaft to one side of the shaft, although they are illustrated extending on opposite sides in FIG. 2 for convenience and clarity. The arrangement of the incoming and outgoing lines will be dependent on the position of the building relative to the various adjacent service lines.

Figure 3:
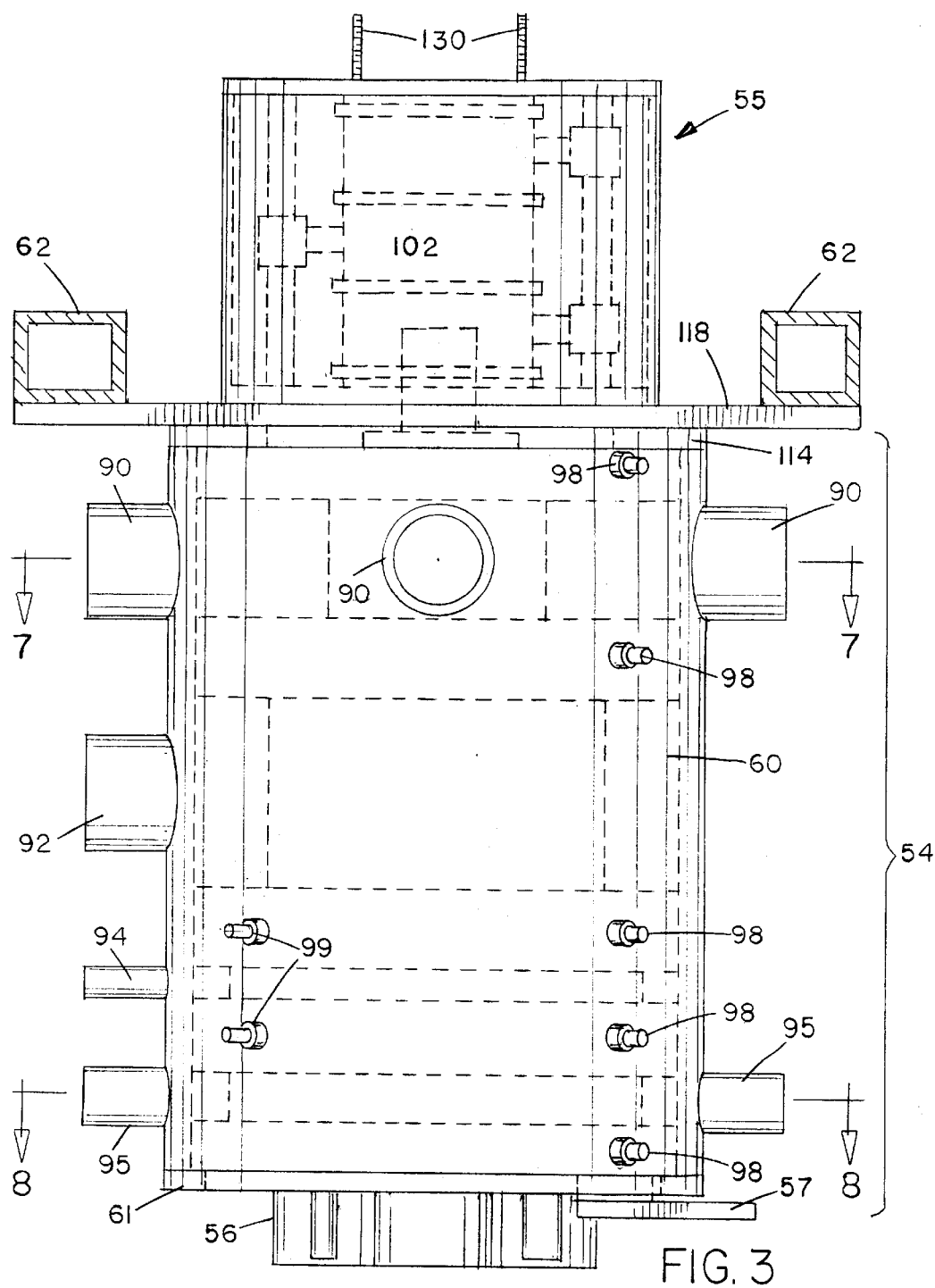
FIG. 3 is front elevational view of the swivel support apparatus.

The swivel joint assembly 14 will now be described in more detail with reference to FIGS. 2 to 9. The assembly 14 has a lower portion 54 for coupling the gas, sewer and water lines into and out of the rotating structure, and an upper portion 55 for coupling the electrical power and service lines. The lower portion 54 basically comprises an inner fixed spool 56 and an outer swivel casing 60 rotatably mounted on fixed spool 56 as illustrated in FIGS. 3 and 6 to 8. The fixed spool 56 is coupled to the fixed base of the building via a torque bracket or lug 57 connected to torque tie 58 within pit 34, as indicated in FIG. 2. The swivel casing 60 is connected to the rotating portion 10 of the building by supports beams 62 which extend across the top of the casing as illustrated in FIGS. 2 and 3, and are secured at their opposite ends to the rotating shaft 30. The casing 60 is rotatably supported on a fixed brass bearing ring 61 at its lower end, which in turn is secured to torque bracket or lug 57, as indicated in FIG. 3.

The fixed inner spool 56 is illustrated in detail in FIGS. 4 to 8 and has a central through bore 63 and a plurality of outwardly facing, annular chambers 64,65,66, and 67 separated by annular rings 68,69,70,71 and 72 at the top and bottom of the spool and between each adjacent pair of chambers. The swivel casing is a cylindrical member which rotates around the inner spool and has a diameter slightly greater than the diameter of the outer rings 68 to 72, so that it forms an outer wall for each of the annular chambers, as best illustrated for chamber 65 in FIG. 6 and chamber 64 in FIG. 7. Ring seals 76 are mounted on each annular ring to project outwardly into rotatable sealing engagement with the inner surface of casing, 60, sealing each of the chambers from the adjacent chambers and the exterior of the swivel joint assembly. One ring seal 76 is mounted on each of the upper and lower rings 68 and 72, while two spaced ring seals 76 are provided on each of the rings 69,70 and 71 which separate adjacent chambers, for additional security. The seals are of any suitable resilient seal material of sufficient durability and reliability. Suitable seals for use as the ring seals 786 are Z-seals with a nitride or poly-vi lip and a fluorotrel base, as manufactured by Norther American Seals of Fresno, Calif.

Figure 7:
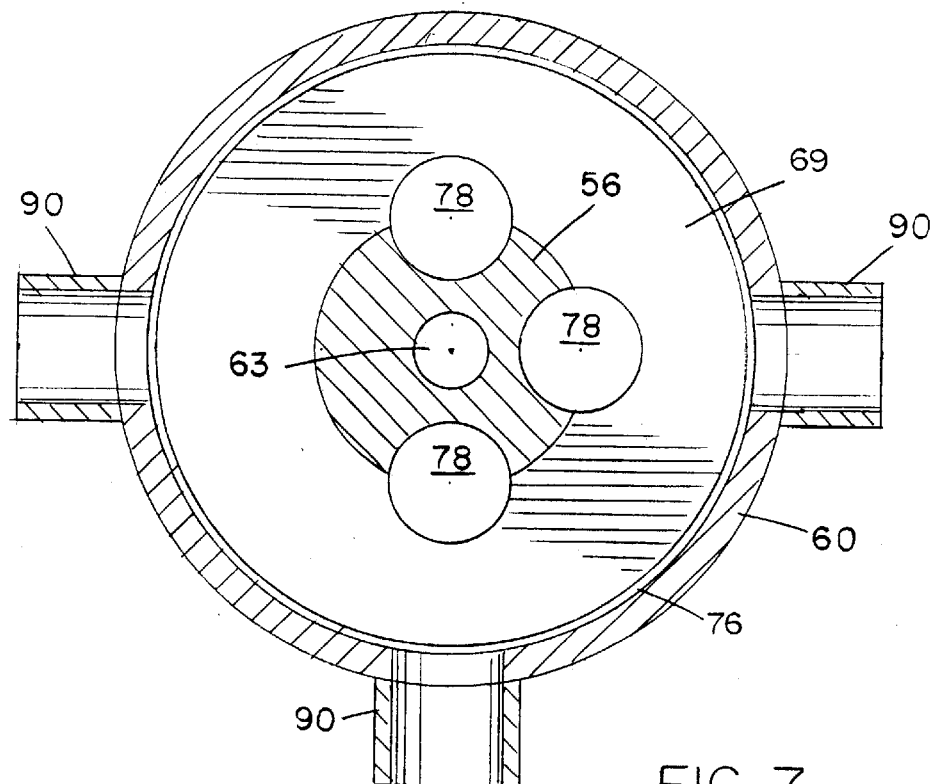
FIG. 7 is a section on the lines 7—7 of FIG. 3.
Figure 8:
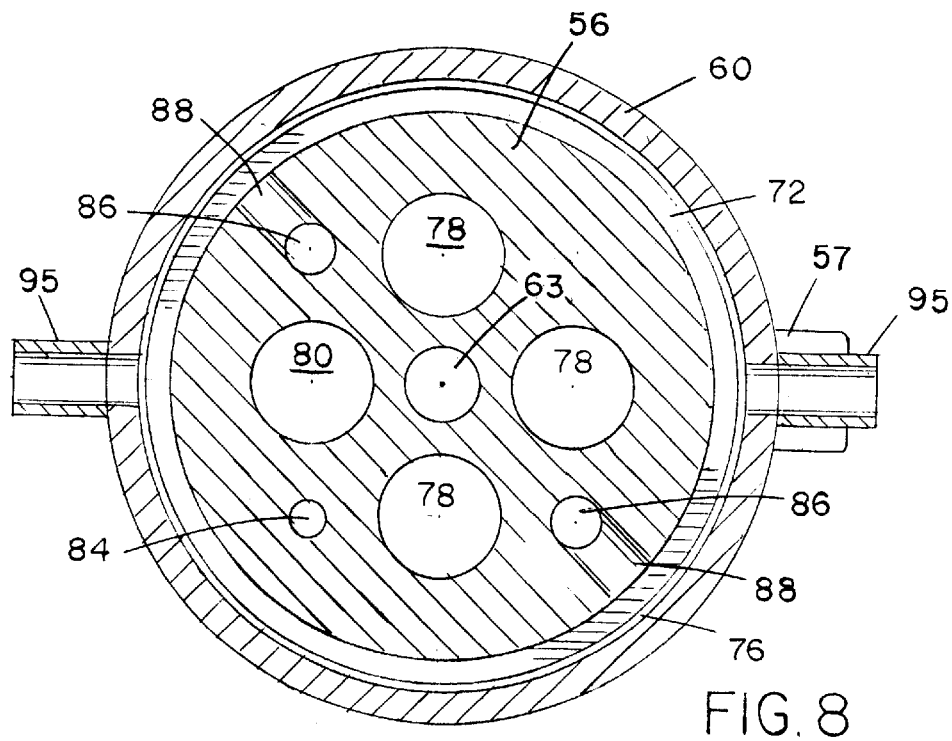
FIG. 8 is a section on the lines 8—8 of FIG. 3.

The annular chambers 64 to 67 are of different sizes, depending on the required fluid capacity. Each chamber is connected to one or more ports extending upwardly from the lower end of the spool through the central portion of the spool and terminating in the respective chamber. The upper, relatively large annular chamber 64 is designated as a sewer chamber, the next chamber 65 is for gray or waste water, the third chamber 66 is for gas, and the fourth chamber 67 is for the clean water supply to the house. As indicated in FIGS. 4, 6 and 7, a series of three ports or bores 78 are connected to the fixed sewer line 38 at the lower end of the spool, and extend upwardly through the spool to terminate in chamber 64. A port or bore 80 of equivalent diameter to ports 78 is connected to a fixed, gray water outlet line 40 and extends upwardly through spool 56 to terminate at an outlet 82 in chamber 65, as indicated in FIGS. 4 and 6. A third bore or port 84 of smaller diameter is connected to a gas line 40 at the lower end of the assembly 14 and extends upwardly through the spool to terminate at an inlet 85 into chamber 66. A pair of ports or bores 86 extend from fixed water lines 40 through the spool to terminate at an inlet 88 into the lowermost or clean water chamber 67, as illustrated in FIGS. 3,4 and 8.

The outer swivel casing forms an outer, rotating cylindrical wall for each of the chambers 64 to 67, and includes various ports for connection to utility lines extending to various fixtures within the rotating part of the building, such as sinks, showers, baths, toilets, gas powered devices and the like. As best illustrated in FIGS. 3 and 7, three ports 90 project radially through the wall of casing 60 and communicate with the sewer chamber 64. A gray water port 92 is spaced beneath one of the ports 90 and communicates with the gray water chamber 65. A small diameter gas port 94 is positioned in the casing beneath port 92 and communicates with gas distribution chamber 66. Finally, a pair of clean water ports 95 are positioned below port 94 and communicate with water chamber 67, as illustrated in FIG. 8. The various sewer and utility lines 42,44, only some of which are shown in FIG. 2 for illustration purposes, are connected to the various ports 90,92,94 and 95 and extend upwardly alongside the elevator shaft 30, exiting away from the shaft at the two or more floor levels for connection to the appropriate fixtures within the living areas of the rotating structure.

Each of the annular rings or flanges 68 to 72 defining the axial end walls of the various chambers also has a groove or indent 96 on its outer periphery which forms a sensor chamber. The indent 96 is located between the seal rings on the annular flanges 69,70 and 71 between adjacent chambers, and above or below the seal ring 76 on the end flanges 68 and 72, respectively. As illustrated in FIG. 3, a pair of diametrically opposed water sensors 98 are mounted on the outer swivel casing 60 to extend through sealed holes in the casing into the uppermost indent or chamber 96. A pair of diametrically opposed water sensors 98 are also mounted to extend through the casing into the chamber 96 in flange 69. These sensors will detect any leakage of sewer water from the sewer chamber 64. Water sensors 98 also project through the casing into the chambers 96 in flanges 70,71 and 72, as indicated in FIG. 3, to detect any leakage of gray water from chamber 65, or clean water from chamber 67. Gas sensors 99 also extend into the chambers 96 in flanges 70 and 71 at opposite ends of the gas supply chamber 66, so that these chambers have sensors for detecting leakage of either gas or water past the seals 76, as illustrated in FIG. 3.

The utility swivel assembly therefore incorporates multiple sensors for detecting failure of any of the ring seals. Each sensor chamber has at least two sensors for water, and the sensor chambers between gas and water chambers have two water sensors and two gas sensors. This provides redundancy in case of failure of a sensor. There are two annular or ring seals between adjacent chambers, providing further redundancy to reduce the risk of any mixing between the various fluid inputs and outputs to and from the house. The sensor outputs will be connected to a control unit having a computer controller within the house, and will indicate failure of any of the seals. The swivel assembly is very simple in construction and provides easy access for repair or replacement of seals or sensors.

Figure 9:
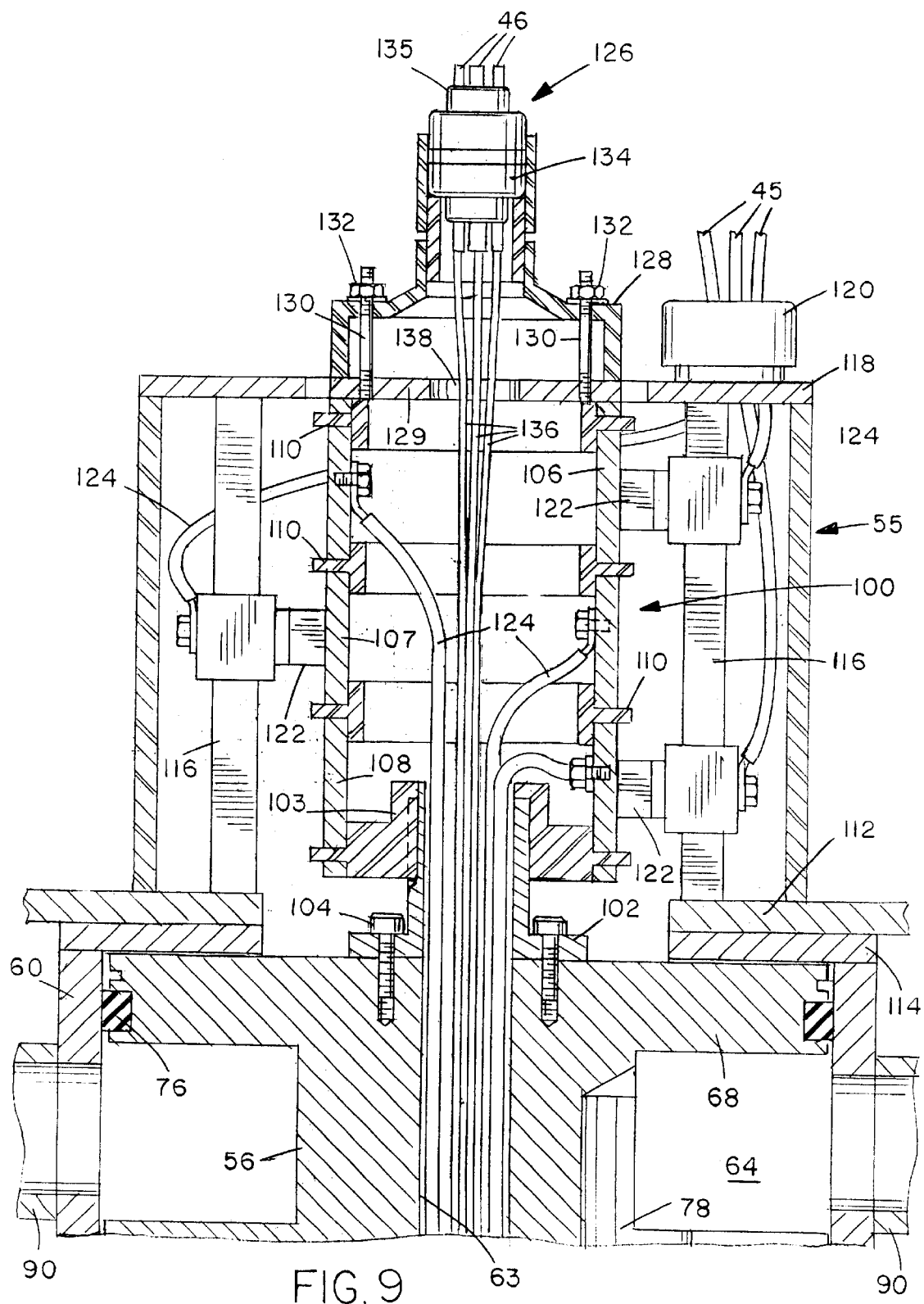
FIG. 9 is a sectional view of the electrical part of the swivel assembly.

The upper or electrical portion 55 of the swivel assembly is mounted on top of the plumbing part 54 of the swivel, as illustrated in FIGS. 3,4 and 9. As best illustrated in FIG. 9, the electrical supply swivel 55 is a three conductor electrical swivel, and includes an inner, fixed power conducting core 100 which is secured to the upper end of the fixed utilities spool 56 via coupling sleeve 102 secured to the upper end of the spool by mounting bolts 104, and an end plug 103 of the core which is keyed to the coupling sleeve 102. Electrical power supply lines 105 extend upwardly through the central through bore 63 in the fixed spool 60, into the conductive core 100, and are secured to three separate conductive rings 106,107 and 108 in the core 100, which are separated by insulator rings 110.

The electrical swivel has an outer rotating portion having a base plate 112 secured to the top plate 114 of the outer swivel casing 60 of the plumbing swivel, and a series of upwardly projecting posts 116 projecting upwardly from the base plate around a ring spaced outwardly from core 100, and connected to a top plate 118 at the upper end of the swivel. A junction box 120 is mounted on the rotating top plate 118 and the power supply lines 45 extend upwardly from box 120 along the elevator shaft and project outwardly for connection to various electrical sockets and appliances within the rotating portion of the house. Spring loaded brushes 122 project inwardly from the posts 116 to contact the three conductive rings 106,107, and 108, respectively. A connecting line 124 extends from each brush 122 to the junction box 120, as illustrated in FIG. 9.

An eight conductor, low noise rotating electrical connector 126 is mounted on top of the electrical swivel 55 via a rubber coupling sleeve 128 bolted to the top plate 129 of the fixed part of the electrical swivel via threaded rods 130 and bolts 132. The connector 126 has a lower fixed portion 134 and an upper rotating portion 135 which is connected to the various electrical service lines 46 extending into the house for communication of TV, telephone and computer signals and the like. The fixed portion 134 is coupled to the fixed core 106 of the electrical swivel. Fixed electrical service lines 136 for cable, computer, TV and telephone signals extend upwardly through the central bore 63 in the fixed spool 56, the center of the fixed power conducting core 106 of the electrical swivel, and a central opening 138 in the top plate 118 of the rotating part of the electrical swivel, and are connected to the fixed lower portion 134 of the rotary connector 126.

The electrical swivel 55 may be a standard, off-the-shelf electrical slip ring swivel for providing 240 Volt, 200 Amp electrical supply to the rotating portion of the structure. The upper, rotary electrical connector 126 is preferably an eight wire, mercury filled rotating harness which is very low noise and produces minimal signal interference, such as the Model No. 830 rotating connector available from Mercotac Inc. of Carlsbad, Calif., or equivalents. Similar connectors with a greater or lesser number of conductors or different amperage or voltage may be used if required.

A suitable drive mechanism (not illustrated) will be provided for rotating the rotatable portion 10 of the house in either direction relative to the fixed base 12, with the swivel joint apparatus allowing all of the utility and electrical service lines within the rotating portion of the house to rotate relative to the fixed part of the apparatus 14. In an exemplary embodiment, the drive mechanism used a three horsepower motor with ramp up and ramp down speed control so movement will not be felt by individuals within the moving part of the structure. The movement can be stopped, reversed, or varied as desired via a control panel within the building, and may be manual or voice controlled.

The swivel joint apparatus 14 of this invention is very simple in construction and allows for easy access and repair. It has built in sensors for detecting any failure in the seals, and the seals, rotary bearings, and other portions of the apparatus are of sufficient strength and durability to potentially last over twenty years without any major service. Unlike prior art swivel joints for rotating buildings, the apparatus 14 will meet most building codes for plumbing and electrical connections Although an exemplary embodiment of the invention has been described above by way of example only, it will be understood by those skilled in the field that modifications may be made to the disclosed embodiment without departing from the scope of the invention, which is defined by the appended claims.

We claim:

1. A rotatable building structure, comprising:
   a fixed base;
   a building rotatably mounted on the fixed base for rotation about a central axis of rotation coaxial with the building and base;
   the building including a central elevator shaft projecting upwardly from the base through the height of the building and having a lower end rotatably mounted on the base;
   the base having an outer mounting rail extending in a circular path and spaced outwardly from the elevator shaft;
   the building having a lower wall having a series of spaced pairs of bearings running along opposite sides of said mounting rail for rotatable support of the building as it rotates on said base; and
   a swivel joint assembly mounted in the base coaxially with said elevator shaft and beneath said lower wall for rotatably connecting fixed utility lines extending into the base with corresponding utility lines secured within the rotating building.

2. The structure as claimed in claim 1, wherein the base has a chamber extending below ground level, the chamber having a drain outlet, the rotatable building having a roof, and a drain line extending from the roof downwardly alongside the elevator shaft and into said chamber, the drain line having an outlet end in said chamber for directing water collected on said roof into said drain outlet.

3. A rotatable building structure, comprising:
   a fixed base:
   a building rotatably mounted on the fixed base for rotation about a central axis of rotation coaxial with the building and base;
   the building including a central elevator shaft projecting upwardly from the base through the height of the building and having a lower end rotatably mounted on the base;
   the base having an outer mounting rail extending in a circular path and spaced outwardly from the elevator shaft;
   the building having a lower wall having a series of spaced pairs of bearings running along opposite sides of said mounting rail for rotatable support of the building as it rotates on said base;
   a swivel joint assembly mounted in the base coaxially with said elevator shaft and beneath said lower wall for rotatably connecting fixed utility lines extending into the base with corresponding utility lines secured within the rotating building;
   the base having a chamber extending below ground level; and
   the swivel joint assembly being mounted in said chamber.

4. A rotatable building structure, comprising:
   a fixed base;
   a building rotatably mounted on the fixed base for rotation about a central axis of rotation coaxial with the building and base;
   the building including a central elevator shaft projecting upwardly from the base through the height of the building and having a lower end rotatably mounted on the base;
   the base having an outer mounting rail extending in a circular path and spaced outwardly from the elevator shaft;
   the building having a lower wall having a series of spaced pairs of bearings running along opposite sides of said mounting rail for rotatable support of the building as it rotates on said base;
   a swivel joint assembly mounted in the base coaxially with said elevator shaft and beneath said lower wall for rotatably connecting fixed utility lines extending into the base with corresponding utility lines secured within the rotating building;

the base having a chamber extending below around level; and the swivel joint assembly comprising a fixed central spindle secured to the fixed base and having a central axis extending coaxially with the axis of rotation of the building, the spindle having a series of spaced, radially outwardly projecting annular flanges forming a series of outwardly facing annular chambers between said flanges, each flange having an outer peripheral edge and at least one ring seal mounted on said peripheral edge, an outer casing rotatably mounted on said spindle and having a predetermined inner diameter for rotatable sealing engagement with said ring seals, whereby the casing forms an outer wall of each of the annular chambers, the casing being tied to the lower wall of the rotatable building and having at least one through port aligned with each annular chamber, each through port being connected to a respective utility line extending into said rotatable building, and the spindle having a lower end wall having a plurality of bores extending axially parallel to said central axis, including at least one bore terminating in each of said chambers, each bore being connected to a respective fixed utility line in said base.

5. The structure as claimed in claim 4, wherein each flange has an outwardly directed, annular sensor chamber spaced from said ring seal, and the outer casing has a series of sensors including at least one sensor projecting into each of the sensor chambers for detecting leakage past said ring seal.

6. The structure as claimed in claim 5, wherein the flanges including an upper end flange, a lower end flange, and a series of intermediate flanges spaced between said upper and lower end flanges, each end flange having one ring seal and one sensor chamber, and each intermediate flange having a pair of ring seals with the sensor chamber located between the ring seals, whereby sensors extending into the sensor chambers in respective intermediate flanges detect leakage from the adjacent chambers on opposite sides of said intermediate flanges.

7. A rotatable building structure, comprising:

a fixed base;

a building rotatably mounted on the fixed base for rotation about a central axis of rotation coaxial with the building and base;

the building including a central elevator shaft projecting upwardly from the base through the height of the building and having a lower end rotatably mounted on the base;

the base having an outer mounting rail extending in a circular path and spaced outwardly from the elevator shaft;

the building having a lower wall having a series of spaced pairs of bearings running along opposite sides of said mounting rail for rotatable support of the building as it rotates on said base;

a swivel joint assembly mounted in the base coaxially with said elevator shaft and beneath said lower wall for rotatable connecting fixed utility lines extending into the base with corresponding utility lines secured within the rotating building;

the swivel joint assembly comprising a fixed central spindle having a lower end secured to the fixed base and an upper end, and having a central axis extending coaxially with the axis of rotation of the building, an outer casing rotatably mounted on the spindle and tied to the lower wall of the rotatable building, the outer casing having an upper end, and a plurality of separate, sealed chambers defined between said spindle and casing, each utility line within the building being connected to a respective chamber and each fixed utility line being connected to a respective chamber via said spindle;

an electrical swivel assembly mounted on the upper end of the fixed spindle and outer casing, the electrical swivel assembly comprising an inner contact core mounted on the upper end of the fixed spindle, and an outer rotating contact portion mounted on the upper end of the outer casing, the spindle and contact core having aligned axial through bores, and fixed electrical power supply lines extending from the base of the structure through the aligned through bores being connected to the inner contact core of the electrical swivel assembly, the outer contact portion having contacts connected to electrical service lines within the rotating building.

8. The structure as claimed in claim 7, wherein the rotating building includes a first set of electrical service lines for transmission of electrical service signals to and from the building, and the swivel assembly includes a rotary electrical connector mounted on said electrical swivel assembly for connection of the first set of electrical service lines to a second set of fixed electrical service lines in the base of the structure, the rotary electrical connector having a fixed part mounted on top of the inner fixed contact core of the electrical swivel assembly and a rotating part rotably mounted on the fixed part, the rotating part having first contacts connected to said first set of electrical service lines, and the fixed part having second contacts rotably connected to said first contacts, said second set of fixed electrical service lines including conductive lines extending through said aligned central through bores of said spindle and contact core and connected to said second contacts of said rotary connector.

9. The structure as claimed in claim 8, wherein said rotary electrical connector comprises a low noise mercury swivel.

10. The structure as claimed in claim 1, wherein the mounting rail comprises an inverted T-section rail and the lower wall of the building has a series of spaced wobble boxes, two pairs of bearings being mounted in each of the wobble boxes and each pair of bearings comprising an inner bearing running along the inside of the rail and an outer bearing running along the outside of the rail.

11. A rotatable building structure, comprising:

a fixed base;

a building having a lower end wall rotatably mounted on the fixed base for rotation about a central axis of rotation coaxial with the building and base;

the base having an outer mounting rail extending in a circular path having a center aligned with said central axis of rotation;

the lower end wall of the building having runner means running along said mounting rail for rotatable support of the building as it rotates on said base;

a swivel joint assembly mounted in the base coaxially with said central axis and beneath said lower end wall for rotatably connecting fixed utility lines extending into the base with corresponding utility lines secured within the rotating building;

the swivel joint assembly comprising a first, fixed member secured to the fixed base and extending co-axially with the central axis of rotation of the building, and a second member rotatably mounted on the first, fixed member and secured to the rotating building so as to rotate with the building;

the first member and second member having opposing portions forming at least four annular fluid chambers for communication of four different utility fluids between the rotatable building and fixed utility lines in the base, and a plurality of seals between the members for sealing the chambers;

the first member having a plurality of first ports connected to the respective chambers and to respective fixed utility lines in the base of the building; and the second member having a plurality of second ports connected to the respective chambers and to respective utility lines within the rotating building.

12. The structure as claimed in claim 11, including at least one pair of adjacent seals between each pair of chambers, a sensor chamber located between each adjacent pair of seals, and at least one sensor in each sensor chamber for detecting fluid leakage between chambers.

13. The structure as claimed in claim 12, including at least two sensors in each sensor chamber.

14. The structure as claimed in claim 13, wherein at least a first said chamber is for communicating gas between a fixed gas utility line and a gas utility line in said rotatable building, and at least one gas sensor and one water sensor are located in the sensor chamber adjacent said first chamber.

15. A rotatable building structure, comprising:

a fixed base;

a building having a lower end wall rotatably mounted on the fixed base for rotation about a central axis of rotation coaxial with the building and base;

the base having an outer mounting rail extending in a circular path having a center aligned with said central axis of rotation;

the lower end wall of the building having runner means running along said mounting rail for rotatable support of the building as it rotates on said base;

a swivel joint assembly mounted in the base coaxially with said central axis and beneath said lower end wall for rotatably connecting fixed utility lines extending into the base with corresponding utility lines secured within the rotating building;

the swivel joint assembly comprising a first, fixed member secured to the fixed base and extending co-axially with the central axis of rotation of the building, and a second member rotatably mounted on the first, fixed member and secured to the rotating building so as to rotate with the building;

one of said members having a plurality of annular chambers facing said other member, said chambers having annular walls having end faces facing said other member;

at least one annular seal mounted on the end face of each annular wall and in rotatable sealing engagement with said other member;

at least one sensor between each adjacent pair of chambers to detect leakage of fluid from said chambers;

the first member having a plurality of first ports connected to respective fixed utility lines in said base, each first port extending into a respective one of said chambers; and the second member having a plurality of second ports, each second port extending into a respective annular chamber and connected to a respective utility line extending into the rotatable building.

* * * * *